MAGNETIC RECORDING AND REPRODUCING APPARATUS

Filed April 27, 1959

8 Sheets-Sheet 1

INVENTOR.
PHILIP E. O'CONNELL

BY Morris ... [signature]

ATTORNEY

Nov. 9, 1965 P. E. O'CONNELL 3,216,275

MAGNETIC RECORDING AND REPRODUCING APPARATUS

Filed April 27, 1959 8 Sheets-Sheet 2

INVENTOR.
PHILIP E. O'CONNELL

BY Morris A. Pakkin
ATTORNEY

Nov. 9, 1965 P. E. O'CONNELL 3,216,275

MAGNETIC RECORDING AND REPRODUCING APPARATUS

Filed April 27, 1959 8 Sheets-Sheet 3

INVENTOR.
PHILIP E. O'CONNELL
BY Morris Rabkin
ATTORNEY

INVENTOR.
PHILIP E. O'CONNELL
BY Morris A. Lebkin
ATTORNEY

INVENTOR.
PHILIP E. O'CONNELL
BY Morris A. Rabkin
ATTORNEY

Nov. 9, 1965 P. E. O'CONNELL 3,216,275

MAGNETIC RECORDING AND REPRODUCING APPARATUS

Filed April 27, 1959 8 Sheets-Sheet 6

INVENTOR.
PHILIP E. O'CONNELL
BY Morris A. Rabkin
ATTORNEY

MAGNETIC RECORDING AND REPRODUCING APPARATUS

Filed April 27, 1959

INVENTOR.
PHILIP E. O'CONNELL
BY Morris L. Rabkin
ATTORNEY

Nov. 9, 1965 P. E. O'CONNELL 3,216,275

MAGNETIC RECORDING AND REPRODUCING APPARATUS

Filed April 27, 1959 8 Sheets-Sheet 8

INVENTOR.
PHILIP E. O'CONNELL
BY Morris A. Rabkin
ATTORNEY 3,216,275

MAGNETIC RECORDING AND REPRODUCING APPARATUS

Philip E. O'Connell, Cambridge, Ohio, assignor to Radio Corporation of America, a corporation of Delaware Filed Apr. 27, 1959, Ser. No. 809,267
4 Claims. (Cl. 74—483)

The present invention relates to magnetic recording and reproducing apparatus, and more particularly to control mechanisms for such an apparatus.

Several types of control mechanisms are used in magnetic recording and reproducing equipment which is now commercially available. These mechanisms involve levers, slidable knobs, pushbuttons and the like in association with other mechanical elements to perform the various operating functions needed in magnetic recording and reproducing operations. While most of the available control mechanisms operate satisfactorily, it has been found that pushbutton operated control mechanisms are most suitable for use in equipment intended for general use, particularly by persons who do not possess a great degree of mechanical skill. A simple and foolproof pushbutton control mechanism for magnetic recording and reproducing equipment has, therefore, been sought after.

Many of the pushbutton control mechanisms provided in the past have been expensive to manufacture because of associated complicated motion transfer mechanisms which must operate further mechanisms to condition the magnetic recording and reproducing equipment for performing the different operating functions thereof. Other pushbutton control mechanisms have been provided with electrical systems instead of complex mechanisms for conditioning the recording and reproducing equipment for operation upon selection of one of the pushbuttons. Such electrical systems have further increased the cost of pushbutton controls. Another defect of previous pushbutton controlled mechanisms has been that they were not sufficiently sturdy to withstand abuse and hard wear normally incident to their operation by unskilled persons and children in the home.

The present invention provides a pushbutton control apparatus which is sturdy, inexpensive and easy to operate. This apparatus is especially suitable for use in a magnetic tape transport mechanism designed to use magnetic tape records carried in cartridges. A tape cartridge transport mechanism incorporating control apparatus provided in accordance with the present invention forms the subject matter of a patent application filed concurrently herewith in the name of Dallas R. Andrews, Serial No. 809,192, now Patent No. 3,093,334 and having the same assignee as that of the present invention.

It is, therefore, an object of the present invention to provide control apparatus for magnetic recording and reproducing equipment especially suitable for use with such equipment as is designed to handle magnetic tape carrying cartridges.

It is another object of the present invention to provide a simple foolproof control apparatus for magnetic tape recording and reproducing equipment.

It is still another object of the present invention to provide improved pushbutton mechanisms for controlling a magnetic tape recording and reproducing apparatus.

It is a still further object of the present invention to provide an improved pushbutton control mechanism for a tape transport which is foolproof in that it prevents simultaneous actuation of a plurality of the pushbuttons contained therein.

It is still further object of the present invention to provide a more sturdy pushbutton control mechanism for magnetic recording and reproducing equipment than has been available heretofore.

It is a still further object of the present invention to provide an improved pushbutton control mechanism which is not complicated by unnecessary mechanism or systems for conditioning the apparatus to perform the different operating functions thereof, when the pushbuttons are actuated.

Briefly described, a control apparatus incorporating the features of the present invention includes a plurality of pushbutton control members slidably mounted in the tape transport mechanism associated therewith. The mounting may be on shafts secured in the tape transport mechanism which permits a sturdy compact structure for the pushbutton mechanism. An arrangement of levers is associated with the mechanism for operating the brakes, the arrangement of levers also being associated with an electrical switch for controlling the drive motor so that the switch is actuated to turn the motor on and off incident to the release and application of the brakes, respectively. The brake mechanism includes spring brake arms normally urged into contact with the driving elements of the tape transport mechanism. These brake arms may be released through a coupling connecting one of the levers in the pushbutton mechanism to the brake arms.

A simplified lever system is provided in accordance with the invention which directly couples any of the pushbuttons to mechanisms for conditioning the recording and reproducing apparatus for different reeling functions.

The invention itself, both as to its organization and method of operation, as well as the foregoing and other objects and advantages thereof, will become more readily apparent from a reading of the following description in connection with the accompanying drawings in which.

Figure 2:
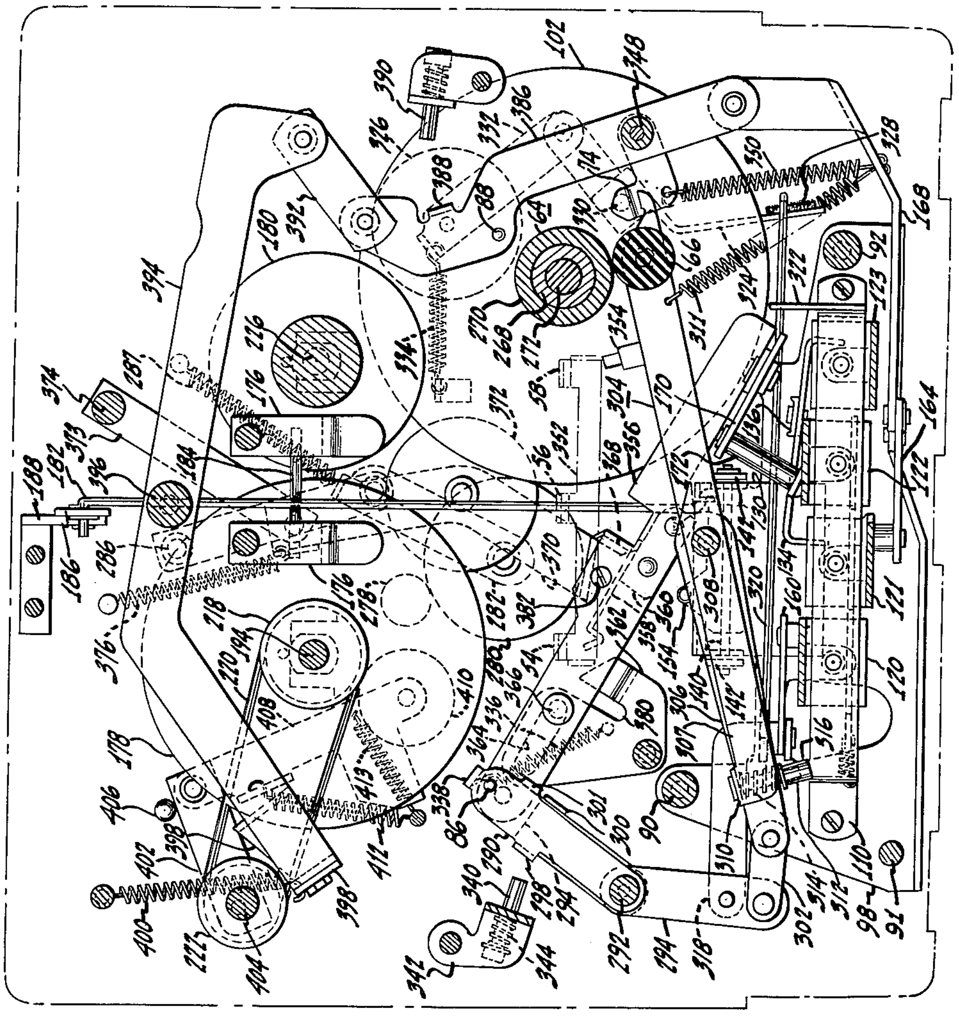
FIG. 2 is a top plan view of the mechanism shown in FIG. 1 with the tape deck panel removed and with the pushbuttons removed and the mechanism being shown in the stop position.
Figures 9, 10, 11, 11A, 13, 14:
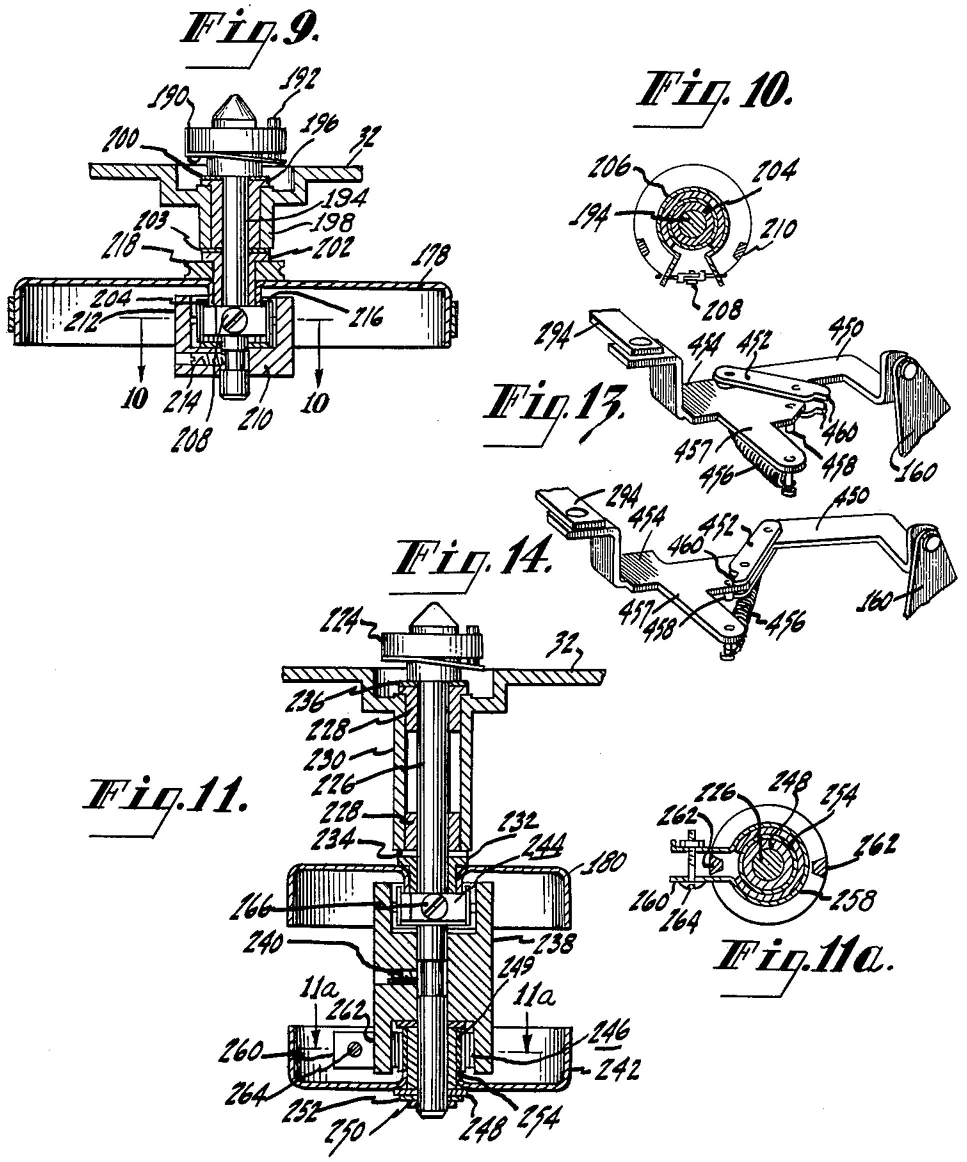
FIG. 9 is a fragmentary sectional view showing the supply hub assembly.
FIG. 10 is a sectional view taken along the line 9—9 in FIG. 9.
FIG. 11 is a sectional view showing the take-up hub assembly.
Figure 12:
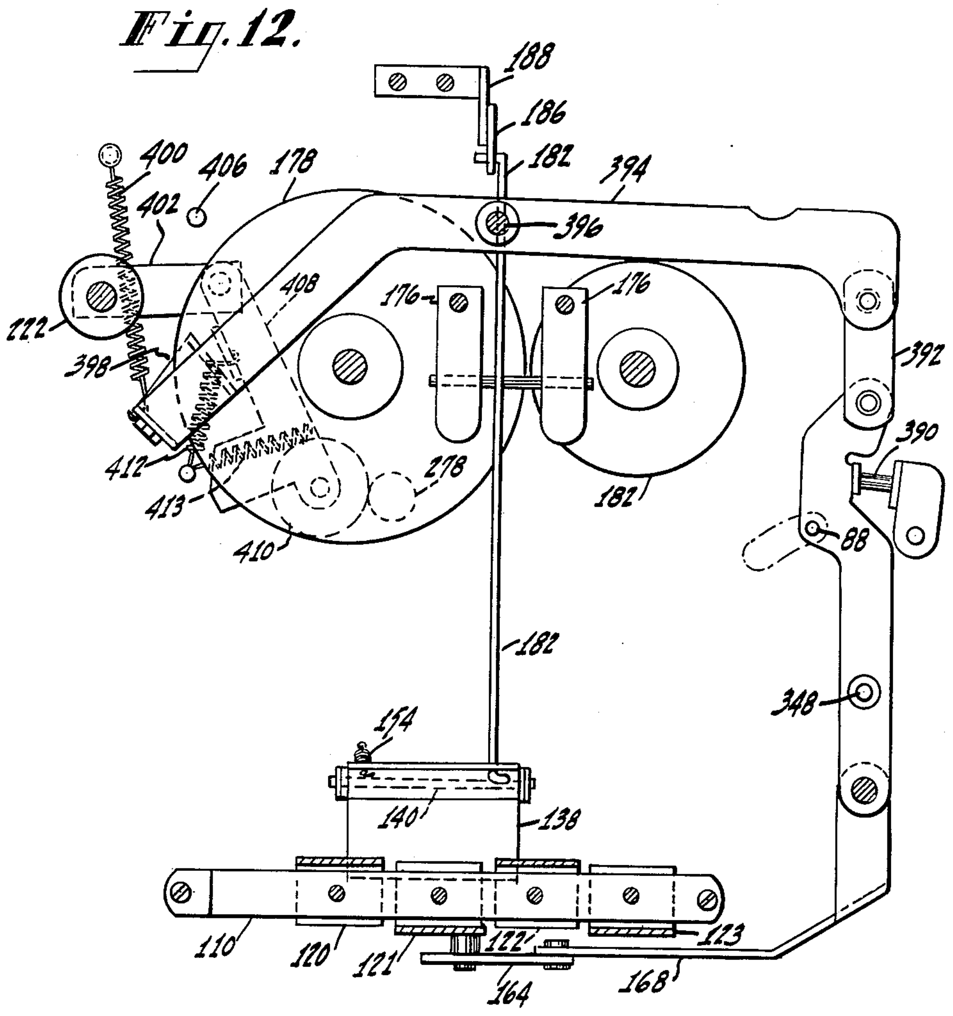

FIG. 11*a* is a sectional view taken along the line 11*a*—11*a* in FIG. 11;

FIG. 12 is a top plan view similar to FIG. 2 showing certain parts of the tape transport mechanism conditioned for rewinding the tape on the supply reel hub at high speed;

FIG. 13 is a fragmentary plan view of the tension responsive mechanism which is operative during normal reeling with another linkage in place; and FIG. 14 is a view similar to FIG. 13 with the linkage shown therein in extended position.

The drawings show, in greater detail, a magnetic tape transport mechanism which incorporates the control apparatus provided by the present invention. This apparatus is the same apparatus as described in detail in the aforementioned application filed concurrently herewith in the name of Dallas R. Andrews. In order to describe a preferred embodiment of the present invention, a suitable environment for the invention, which is on a magnetic tape cartridge transport mechanism, is presented hereinafter. It should be understood that the pushbutton control apparatus forms the subject matter of the present application.

The amplifiers associated with the tape transport mechanism are not illustrated since they do not form part of the present invention. However, these amplifiers and associated electronic circuits provide for the recording and reproduction of signals on a magnetic tape 22 carried in a tape cartridge 20.

Figure 1:
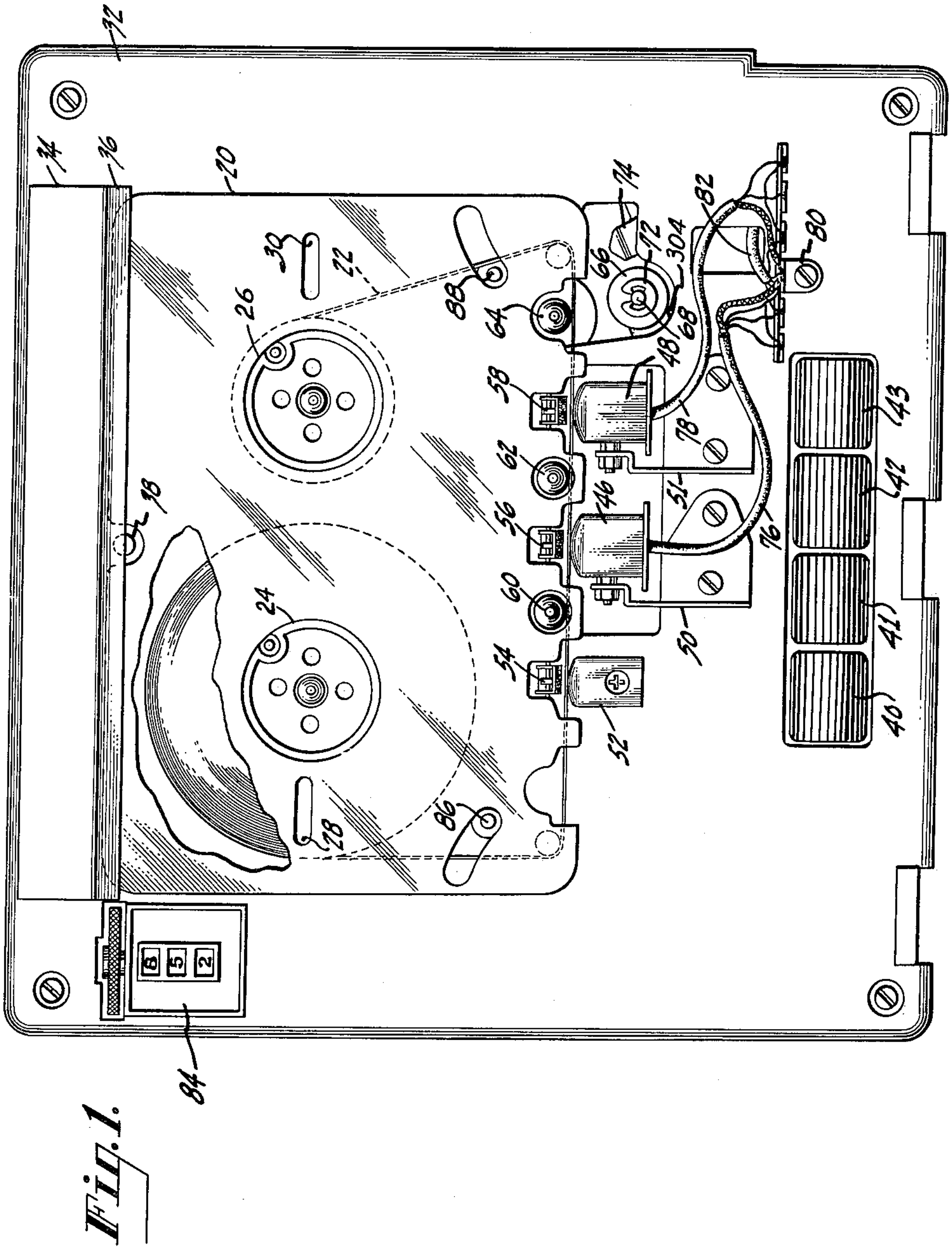
FIG. 1 is a top plan view of a magnetic tape transport mechanism having control mechanisms for handling magnetic tape cartridges and shown with a cartridge in place and with an escutcheon removed.

The tape cartridge 20 shown in FIG. 1 of the drawings is described in detail in a patent application filed in the name of Dallas R. Andrews, Serial No. 738,745, filed May 29, 1958, now Patent No. 3,027,110, and assigned to the same assignee as the present invention. Essentially the cartridge is of the coplanar type and may be of a size capable of being stored in any average book shelf. The cartridge comprises a plastic case made in two parts. The tape is wound on two hubs 24, 26 which will be referred to hereinafter as a supply hub and a take-up hub, respectively.

The outside of the tape transport mechanism is shown in FIG. 1. This mechanism is mounted on a deck panel 32. A back stop bar 34 is located on the rear of the panel. This bar provides a shelf 36 under which the cartridge is received. A pin 38 is located in the center of the back stop 34 and partially under the shelf 36.

Four manual pushbuttons 40, 41, 42 and 43 are provided. The functions of these buttons 40 to 43 are to condition the tape transport mechanism, respectively, for the following functions or operations: play or record, rewind, fast forward and stop. A pair of magnetic heads 46 and 48 are each mounted on a different bracket 50 and 51 on the panel 32. A curved block 52 is used in place of a third head so as to provide a balanced array. An assembly consisting of three pressure pads 54, 56 and 58 cooperates with the block 52 and the heads 46 and 48. These pressure pads are simultaneously actuated to press the tape 22 against the heads by a mechanism to be described hereinafter. The block 52 cooperates with the pad 54 to apply drag tension on the tape 22 thereby eliminating any slack in the tape at the heads which could possibly cause irregular head to tape contact and produce distortion. A pair of tape guides 60 and 62 are located on oppoiste sides of the center pressure pad 56.

A capstan 64 for driving the tape is located to the right of the heads and pressure pad assembly as viewed in FIG. 1. A pressure roller 66 is mounted on the opposite side of the tape from the capstan 64. The pressure roller may be made of some resilient material such as rubber. The roller 66 is rotationally mounted on a stud 68 which projects from an arm 304. A clamp fastener 72, such as a C-washer, may be used to fasten the roller on the stud 68. A hold-down member 74 having an L-shaped projection may be moved with the pressure roller 66 toward the cartridge by an actuation mechanism, to be described hereinafter.

Leads 76 and 78 from the heads are connected to a connector strip 80 mounted on the panel 32. Other leads 82 from the connector strip extend through an opening in the panel 32 and are connected to the electronic equipment associated with the tape transport. A decorative and protective escutcheon (not shown) which may be artistically designed may be placed over the block 52, head 46, pressure roller 68, brackets 50 and 51 and connector 80. This escutcheon may carry a legend indicating the function of each of the pushbuttons 40 to 43. This escutcheon is not shown to illustrate the placement of the aforementioned elements on the panel 32.

A counter 84 which may be of conventional design is located in the left rear corner of the panel. This counter is coupled to the supply hub assembly to be rotated therewith and indicate the amount of tape that has been unreeled from the supply hub.

Pins 86 and 88 for sensing the tension in, and position of, the magnetic tape as it is reeled between the hubs 24 and 26 extend through openings in the panel 32 as well as in the cartridge 20. These pins are shown in the position they occupy when the recorder is stopped; i.e., after the stop button 43 has been depressed. The pin 86 serves the purpose of determining the tension in, and position of, the tape as it leaves the supply hub and therefore the amount of tape left on the supply reel. The pin 88 senses the tension in the tape adjacent the take-up hub 26 and therefore determines the amount of tape remaining on the take-up hub. When either the play/record pushbutton or the fast forward pushbutton 42 is depressed, the pin 86 will be moved to the left so as to ride against the tape. Similarly, the other pin 88 will be moved toward the right when the pushbutton 41 is depressed. At the end of a run of tape (when the tape reaches a point near its end on the hub) during forward reeling operations, the pin 86 will be moved toward the right so as to actuate a tension responsive mechanism to be described hereinafter. The other pin 88 operates in a similar manner during rewind operations.

Operation of the tape transport mechanism is extremely convenient. The rear edge of the cartridge 20 is placed under the shelf 36 of the bar 34. The front of the cartridge is merely pressed downward. The cartridge is then automatically disposed in place on the deck panel 32 with the tape path properly located between the pressure pads, guides and capstan and the heads. The brake slide is released since it will be advanced by the pin 38 to a position where it releases the hubs. For recording or play back operations, the play/record pushbutton 40 is pressed. The tension sensing pin 86 is also shifted to the left so as to ride against the tape 22. The machine is energized and the tape is reeled across the heads from the supply hub 24 to the take-up hub 26. When the tape is nearly exhausted on the supply hub 24, the tension in the tape adjacent the pin 86 increases and the pin 86 is moved to the right. The tension responsive mechanism operates to stop the tape and causes the pressure roller and pressure pads to be released from their positions against the capstan 64 and heads 46 and 48, respectively. The cartridge may then be removed and turned over to play the next record track or tracks. Fast forward or rewind operations may be similarly executed by pressing either the fast forward or rewind pushbuttons 41 and 42. To stop the tape at any point, the stop button 43 is pressed. The mechanisms for controlling the recorder are located below the panel 32 and will be described in connection with FIGS. 2 to 11 and 12.

Figures 3, 4:
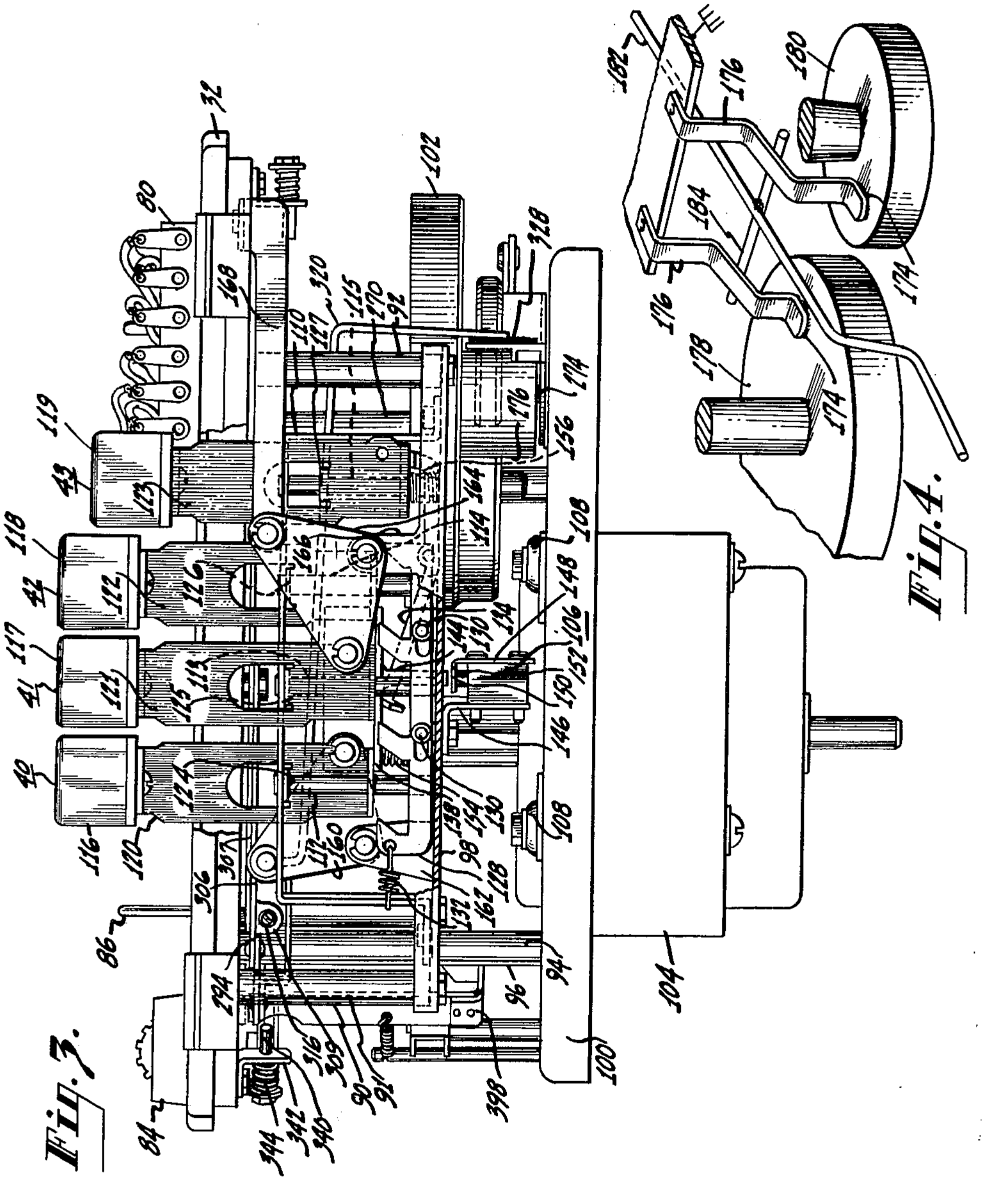
FIG. 3 is a front elevational view of the mechanism shown in FIG. 1 shown partially in section to illustrate the pushbutton mechanism provided by the invention.
FIG. 4 is a fragmentary perspective view schematically showing the brake mechanism used in the tape transport mechanism illustrated in FIGS. 1, 2 and 3 shown with the brakes applied.

The general arrangement of the tape transport mechanism is shown in FIG. 3. The cartridge is shown as being removed from the tape deck panel 32. A plurality of posts depend from the tape deck panel. These include short posts 90, 91 and 92 and longer posts 94 and 96. One of the long posts is not shown. The short posts 90, 91 and 92 support a chassis member 98. The pushbutton assembly for the mechanism is supported between this chassis member 98 and the tape deck panel 32. Another lower chassis member 100 is supported by the long posts including posts 94 and 96. This lower chassis member provides a bearing support for a capstan flywheel 102 The lower chassis member 100 also has an opening for receiving an electric motor 104 which drives the mechanism. This motor 104 is energized through a switch 106 of the microswitch variety which is mounted on the upper chassis member 98. A plurality of rubber mountings 108 cradle the motor and provide substantially vibration-free support therefor.

Figure 6:
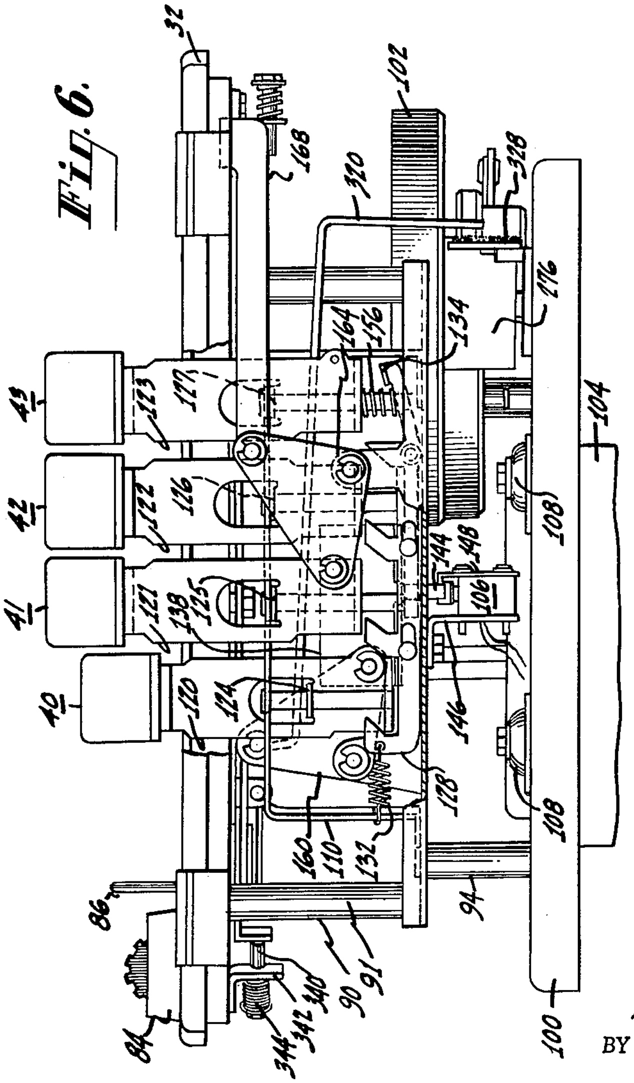
FIG. 6 is a fragmentary elevational front view similar to FIG. 3 showing certain parts of the pushbutton assembly positioned to condition the tape transport mechanism for slow speed reeling in the forward direction during playback or recording operation.

The pushbutton mechanism is best shown in FIGS. 2, 3 and 6. The mechanism is supported on the lower chassis member 98 by means of a bracket 110. This bracket is a U-shaped outboard bearing bracket. Each pushbutton is carried on a different one of four pushbutton shafts 112, 113, 114 and 115. These shafts are secured between the lower chassis member 98 and the bearing bracket 10. Each of the knobs 116, 117, 118 and 119 of the pushbuttons 40, 41, 42 and 43, respectively, are fastened to the top of a different one of four pushbutton knob brackets 120, 121, 122 and 123, respectively. Each of the knob brackets 120 to 123 has flanges at the opposite ends thereof. Each of the knob brackets 120 to 123 also has a tongue 124, 125, 126 and 127, respectively, extending from the center thereof between the end flanges. The tongue and the flanges of each knob bracket extend in the same direction. The tongues and lower end flanges of the knob brackets are mounted for movement on the shafts 112, 113, 114 and 115. Two of the pushbutton knob brackets are located along one edge of the bearing bracket 110, while the other two of the pushbutton knob brackets are located along the other edge of the bearing bracket 110. Adjacent ones of the togue and end flanges extend in opposite directions. This arrangement of the pushbutton brackets around fixed shafts provides for greater rigidity of the pushbutton assembly, conserves space, and provides for convenience of assembly of the pushbutton element with associated motion transfer mechanisms to be described hereinafter.

The lower end flanges of each of the pushbutton brackets 120 to 123 cooperate with a locking slide 128. This locking slide has a pair of elongated openings therein. A pair of tongues project from the lower chassis member 100. Studs 130 project from each of these tongues and extend through the openings in the locking slide 128. The locking slide may therefore slide from left to right over a distance limited by the length of the openings. The slides 128 are kept in place by C-washers fastened to the studs 130. A spring 132 biases the locking slide to the left so that it assumes the position shown in FIG. 3 The locking slide has a plurality of teeth extending therefrom upwardly toward the top of the bearing bracket 110. These teeth have edges which are inclined in the same direction toward the right. The teeth are also separated by a distance slightly greater than the width of any of the bearing brackets 110.

There are four teeth on the locking slide and three openings defined by the adjacent edges of the different teeth. The end flanges of the knob brackets 120, 121 and 122 may be received, only one at a time, within different ones of these openings defined between the teeth of the locking slide 128, when the pushbuttons 40, 41, 42 are depressed.

The end flange of the knob bracket 123 of the stop pushbutton 43 is disposed to cooperate with a pivotally mounted lever 134 which is in the nature of a bellcrank and acts as a stop lever. The lever is pivotally mounted on a bracket attached to the upper chassis member 98. One end of this lever 134 is bent toward the front of the machine to provide a greater contact surface adjacent the end flange of the bracket 123. The other end of the lever 134 is also bent in the same direction as the first mentioned end. A relatively wide bellcrank lever 138 is associated with the lever 134. This bellcrank lever is pivotally mounted on a shaft 140 carried by a pair of flanges 142 on the upper chassis member 98. A tongue 144 extends from the lower arm of the bellcrank lever 138. This tongue actuates the switch 106 which controls the motor 104. The switch 106 is fastened to the upper chassis member 98 by means of a bracket 146. Another bracket 148 is carried by the switch 106. This bracket 148 is made of spring material, such as bronze, and provides a spring switch actuating arm 150. This arm 150 cooperates with the arm 152 of the switch 106 and is adapted to be depressed by the tongue 144 when the bellcrank lever 138 pivots downwardly. The bellcrank lever 138 is also biased to pivot upwardly by means of a spring 154 attached between the upper chassis member 98 and the top of the upper arm of the bellcrank lever 138.

The purpose of the bellcrank lever 138 and stop lever 134 is to cooperate with the stop pushbutton 43 for stopping the machine when the pushbutton 143 is depressed. A spring 156 is wound around the pushbutton shaft 115 for the stop pushbutton 43. This spring biases the pushbutton 43 in the upward direction. It will be noted that no similar bias springs are disposed on the shafts 112, 113 and 114 supporting the other pushbuttons 40, 41, and 42. These pushbuttons are depressed to condition the machine to perform different operating functions. The lower flanges of the knob brackets 120, 121 and 122 of these pushbuttons 40, 41 and 42 also engage the lower arm of the bellcrank 138 which, when any of these pushbuttons 40, 41 or 42 is depressed, tends to bias these buttons upwardly to their original position.

These pushbuttons 40, 41 and 42 will be caused to remain down when depressed by virtue of the mechanisms associated therewith. These mechanisms will be described hereinafter. The mechanism associated with the play pushbutton 40 is coupled thereto by means of a bellcrank 160. This bellcrank 160 is pivotally mounted on a tongue 162 extending from the upper chassis member 98. The mounting is by means of a stud and C-washer arrangement used throughout the entire mechanism to simplify the construction for lower cost. The bellcrank 160 is secured to the knob bracket 120 by means of a pivotal mounting consisting of another stud and C-washer. The rewind pushbutton 41 is similarly connected to a rewind bellcrank 164 which is pivotally mounted to a tongue 166 extending from the upper chassis member 98. This tongue is pivotally connected to the knob bracket 121 of the rewind pushbutton 41 and to the mechanism associated with the rewind pushbutton by way of a rewind connecting link 168. The fast forward pushbutton 42 is also connected to a bellcrank 170 (best shown in FIG. 2) by means of a longer coupling stud 172 than used in the case of the other bellcranks. Accordingly, the mechanisms coupled to each of the pushbuttons 40, 41 and 42, by way of their associate bellcranks 160, 164 and 170, maintain these pushbuttons in down position despite the bias of the spring 154 associated with the bellcrank lever 138.

As shown, particularly in connection with FIG. 6, when any of the pushbuttons 40, 41 or 42 is down, say for example the pushbutton 40, as shown in FIG. 6, the locking slide 128 is urged against the bias of its spring 132 toward the right. This is accomplished by the force exerted on the inclined one of the teeth engaged by the end flange of the play/record knob bracket 120. It will be observed that the upper edges of the teeth are disposed in a position to block the descent of either of the rewind or fast forward pushbuttons 41 and 42, respectively. The case would be the same for either of these pushbuttons 41, 42 when depressed. Then the remaining two pushbuttons could not be depressed. The pushbuttons must be restored to their initial up position by pressing the stop pushbutton before another functional operation of the machine can be selected. Of course, the stop pushbutton need not be depressed if the mechanism is stopped automatically, as would occur upon reaching the end of the tape. This automatic stopping mechanism will be described hereinafter.

The mechanism comprising the levers 134 and 138 which are associated with the stop pushbutton 43 provide an improved means for stopping the operation of the apparatus and for restoring any of the down pushbuttons 40, 41 and 42 to up position. The convenience of operation and low cost of parts and manufacture will be evident from the foregoing description and the drawings which illustrate the disclosed embodiment of the invention. It will be noticed that the pivot lever 134 rotates in a clockwise direction when the stop pushbutton is pressed. This lever engages the lower arm of the bellcrank lever 138. Since the lower arm of the bellcrank lever 138 also engages the end flanges of each of the knob brackets 120, 121, 122, any one of these brackets which happens to be in down position due to the actuation of the pushbutton associated therewith will be urged to up position. A minimum amount of force is necessary to accomplish the stopping operation since a spring bias is already being exerted on the bellcrank lever 138 which tends to pivot this lever in an up direction and also because of the nature of the tension responsive mechanisms associated with each of the pushbuttons 40, 41, 42.

Since the switch operating tongue 144 of the bellcrank lever 138 is pushed downwardly when any of the operating pushbuttons 40, 41 or 42 are pressed, the switch 106 will be actuated when any of these pushbuttons 40, 41 or 42 are depressed. The switch is normally maintained unactuated by means of the spring arm 150 and will be returned to unactuated position when the stop pushbutton 43 is depressed. Since the motor 104 will not operate until the switch 106 is actuated, the mechanism will be idle until conditioned for operation by depressing one of the pushbuttons 40, 41 or 42.

Figure 7:
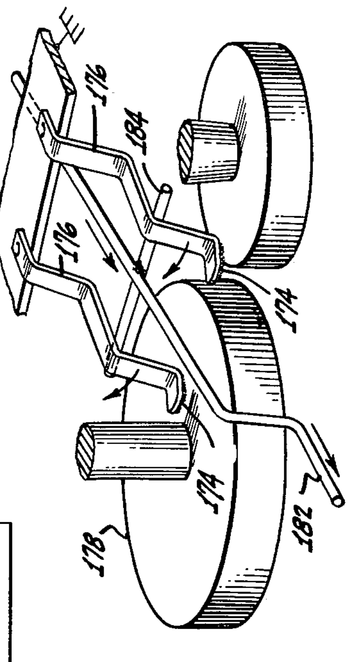
FIG. 7 is a fragmentary perspective view similar to FIG. 4 showing the brake mechanism of the tape transport mechanism with the brakes released.

The brake mechanism is associated with the system of levers 134 and 136 which are actuated by the stop pushbutton 43. This brake mechanism is best shown in FIGS. 2, 4 and 7 of the drawings. The brake shoes are pads 174 of friction material, such as felt, cemented or otherwise attached to the upturned ends of spring members 176. These members are secured to the side of the deck panel 32 and are essentially Z-shaped to provide sufficient leverage and spring action. However, any other shape which would fit among the other elements of the apparatus would be suitable. The brake shoe pads 174 cooperate with the upper faces of a drive pulley 178 for the supply hub. The other one of the brake shoe pads 174 cooperates with the upper surface of a drive pulley 180 for the take-up hub 26. The brake shoes are controlled by a brake control rod 182 and a transverse rod 184 welded or otherwise attached to the brake control rod so as to lie perpendicular thereto. This transverse rod engages the spring members 176 simultaneously so as to lift the pads 174 against the bias of the spring members 176 from the pulleys 178 and 180. The back end of the brake control rod 182 is pivotally mounted at one end of a link 186. This link 186 is mounted on a bracket 188. The front end of the brake control rod 182 is pivotally mounted to the bellcrank lever 138. Thus, the brake control rod 182 swings on the link 186 as it moves with the bellcrank lever 138 between the front and the rear of the mechanism. The control rod 182 also may reciprocate from a lower position as shown in FIG. 4 of the drawings to an upper position as shown in FIG. 7 of the drawings because of its pivotal mounting on the link 186.

Accordingly, when the mechanism is in idle condition, the bellcrank lever 138 will be urged under its spring bias in a clockwise direction. Accordingly, the brake control rod will be urged to the rear of the machine and the link 186 will be substantially perpendicular to the rod. In this position, as shown in FIG. 4, the transverse rod 184 will not interfere with the action of the spring member 176 and the brakes will be applied. Upon pressing any one of the pushbuttons 40, 41, 42 which condition the mechanism for operation, the bellcrank lever 138 will be pivoted in a counter-clockwise direction so as to urge the brake control rod toward the front of the machine. This movement causes the link 186 to swing toward the front of the machine and brings the transverse rod to the upper position shown in FIG. 7. The spring members 176 will then be engaged and the brake pads 174 will be lifted from the pulleys 178 and 180. The brakes are therefore released automatically upon pressing any of the function selection buttons 40, 41, 42. When the stop button is depressed, the stop lever 134 pivots the bellcrank lever 138 in a clockwise direction back to its initial position when the mechanism was idle. This permits the brakes to be applied and stop the machine.

Figure 8:
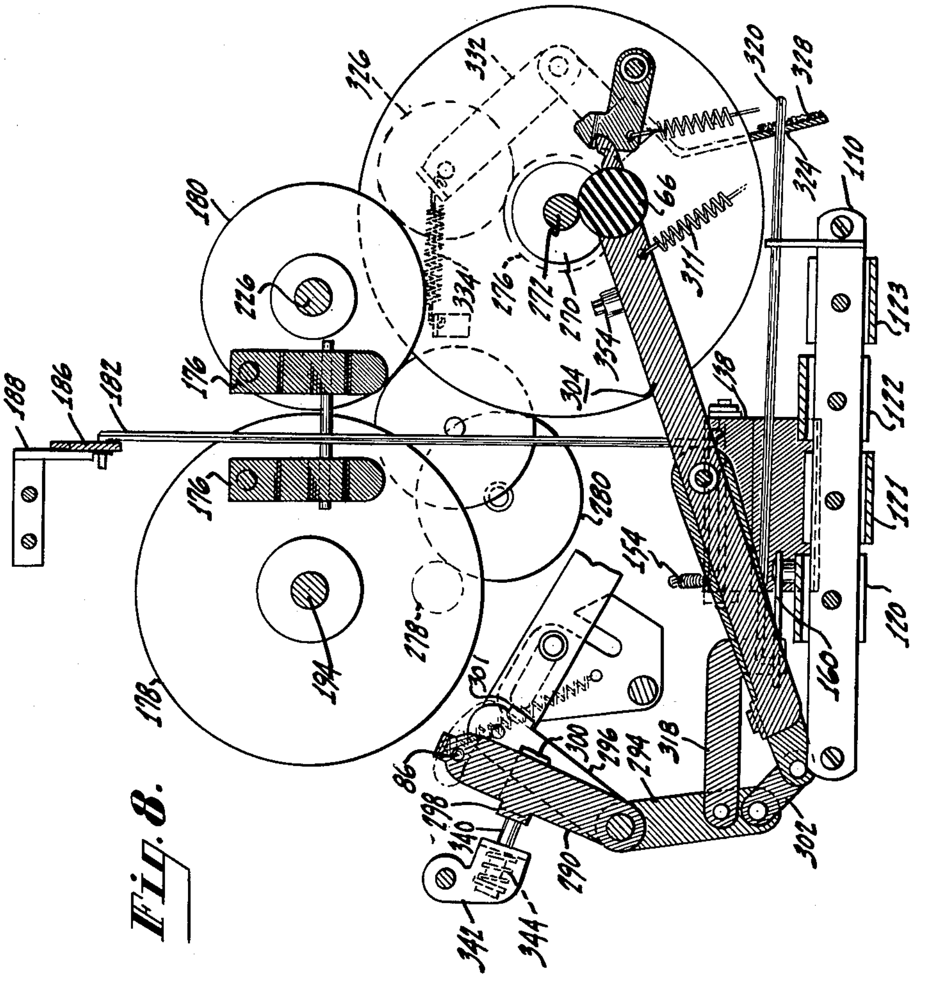
FIG. 8 is a top plan view similar to FIG. 2 showing certain parts of the tape transport mechanism conditioned for tape reeling at slow speed in the forward direction for recording and playback operations.

The tension responsive mechanism which is operative when the apparatus is conditioned for normal reeling operations during recording and playback is illustrated best in FIG. 2 and in FIG. 8. FIG. 2 show that the mechanism in idle condition as would be the case after the stop button 43 was pressed. FIG. 8 shows the mechanism after the pushbutton 40 has been pressed, which is also the condition shown in FIG. 6. Parts of this tension responsive mechanism were described in connection with FIG. 1. These include the tension responsive or trip pin 86. The pin 86 is carried by an arm 290. This arm 290 is privotally mounted on a stud 292 which projects from the panel 32. The stud 292 also provides pivotal support for a bow-shaped lever 294 which is pivotally mounted on the stud 292 in the manner of a bellcrank. Another arm 296 is also pivotally mounted on the stud 292 below the level 294. The arm 296 is associated with the tension responsive mechanism operative during fast forward reeling.

The bow-shaped level 294 is associated with the tension responsive mechanism operative during normal reeling. Both the level 294 and the arm 296 are associated with the arm 290 carrying the pin 86. This association is accomplished by means of a finger 298 which depends from the arm 290. Fingers 300 and 301 extend upwardly from the edge of the bow level 294, and the arm 296 in the fast forward tension responsive mechanism, respectively. The finger 301 on the arm 296 engages the arm 290 when the fast forward tension responsive mechanism is conditioned for operation.

Returning now to the tension responsive mechanism which is operative during normal reeling operation, it will be observed that a floating link 302 is pivotally connected to the bow level 294. This floating link 302 and the bow level 294 form a toggle joint. The floating link 302 is connected to the pressure roller carrying arm 304. This arm 304 is a dual arm having two sections 306 and 307. A finger 309 depends from the lower section 306. Another finger 310 depends from the upper section 307. These fingers are opposed to each other. Both sections are pivoted on a stud 308 depending from the panel 32. The section 307 and the arm 304 are biased for movement in the clockwise direction by a spring 311. The pressure roller 66 is therefore kept away from the capstan 64. Excessive movement of the arm 304 is prevented by the other links 302 and the level 294 of the mechanism.

A screw adjustment device 312 is provided to adjust the force exerted by the pressure roller 66 against the capstan 64. This adjustment device is a screw which extends through the finger 309 on the lower section 306 and is mounted only for rotation (not translation) in the upper section 307 of the pressure roller arm 304 (the section which carries the pressure roller 66). A spring 314 is placed around the screw and pulls the opposed fingers 309 and 310 together. A nut 316 is threaded on the screw 312 and may compress or loosen the spring. Thus, when the pressure roller arm is pivoted in a counter-clockwise direction to bring the pressure roller 66 into contact with the capstan 64, the amount of pressure against the capstan is determined by the tension in the spring 314, which is an adjustable tension.

The end of the pressure roller arm 304 adjacent the pressure roller 66 extends to form a finger which is adapted to engage the member 74 which holds the cartridge down on the panel 32 when the pushbutton 40 is depressed. This member 74 is pivotally mounted on a stud 348 which depends from the panel 32. A spring 350 biases the member 74 toward the front and away from the cartridge. It will be observed, however, that when the pressure roller arm is actuated to pivot in a counter-clockwise sense to bring the pressure roller against the capstan 64, the end of the pressure roller arm will engage the member 74 and advance the member against the bias of its spring 350 into position over the cartridge.

Another function performed by the pressure roller arm, and consequently by the tension responsive mechanism, is the advancement of the pressure pads 54, 56 and 58 into contact with the heads. These pressure pads are mounted on a bracket 352. The bracket is pivotally mounted on another bracket (not shown) which extends from the bottom of the panel 32. A finger 354 extends from the front edge of the pressure roller arm 304. This finger engages the buttom of the bracket 352 and pivots the pressure pads against the heads. A spring (not shown) attached to the bracket 352 normally biases the pressure pads away from the heads.

The pushbutton 40 which selects normal reeling operations is coupled to the tension responsive mechanism through its associated bellcrank 160. This bellcrank is connected to an L-shaped motion transfer link 318. An improved linkage which may be used in place of the link 318 will be described later in connection with FIG. 15. The link 318 is connected to the bow level 294. A rod connecting link 320 is linked to the L-shaped motion transfer link 318. This link 320 is supported on a bracket 322 which is attached to the U-shaped bracket 110 which supports the pushbuttons. The lever 320 is bent near the end thereof and descends to a position whereat it is in cooperative relationship with a lever 324.

This lever 324 is part of a linkage which controls an idler roller 326 in the take-up pulley drive system. The lever 324 has a pad 328 of felt or some other soft material to absorb the initial shock of the rod 320 against it which takes place when the mechanism is stopped and to silence the operation of the mechanism. A stud 330 which extends from the lower chassis member 100 supports the lever 324. The take-up idler pulley 326 is supported by a floating link 332 connected to the lever 324. This lever 332 is spring-biased to the left by means of a spring 334. Accordingly, the rod connecting link 320 normally keeps the idler roller 326 in decoupled position when the recording and reproducing apparatus is idle or stopped. The bow lever 294 and therefore the tension responsive mechanism is also maintained in the position shown when the lever is idle or stopped by means of a spring 336 connected to the end of a finger 338 on the pin carrying arm 290.

The bow lever 294 will be pivoted in a clockwise direction when the play/record button 40 is depressed. The lever 294 engages the finger 298 of the pin carrying arm 290 and carries the arm 290 to the left until the surface of the finger 298 strikes a stop 340. This stop 340 is mounted on a bracket 342. The stop is a screw which is threaded into the bracket 342. A spring 344 around the screw locks the adjustment. This stop adjusts the overtravel of the toggle joint defined by the lever 294 and the link 302 which will be explained hereinafter. The pin 86 will therefore be carried over to the left into engagement with the tape.

The link 302 is a toggle link which moves from the position thereof shown in FIG. 2 to the position shown in FIG. 8 when the pushbutton 40 is pressed. In the idle or stop position shown in FIG. 2, the knee of the toggle joint defined between the link 302 and the lower arm of the lever 294 is bent. The force applied upon pressing the pushbutton 40 is transferred to the toggle joint by way of the link 318 and causes the knee of the toggle joint to straighten and then travel through the straightened position over a predetermined distance. The amount of this over-travel is determined by the setting of the stop 340, since this stop 340 engages the upper end of the bow lever 294 through the finger 298. When the knee of the toggle joint is straightened, the link 302 and the lower arm of the bow lever 294 are in line with each other. It will be observed that the springs 336, 154 and 311 all tend to keep the knee of the toggle joint bent in the position shown in FIG. 2 where the mechanism is in idle or stop condition. The knee of the joint, however, travels through the straightened position thereof and therefore cannot be returned to the bent position shown in FIG. 2 by the forces applied through the springs 154, 311 and 336 alone. It is a well-known property of a toggle joint that the force required to straighten the joint increases greatly as the joint approaches straightened position. Thus, when the joint is straightened by the force manually applied by pressing the pushbutton 40 thereby overcoming the spring forces, a force greater than a spring force is necessary to return the toggle joint to the bent knee position shown in FIG. 2. In other words, the toggle joint serves as a detent or locking mechanism after it travels through the straightened knee position.

The toggle joint pivots the pressure roller arm 304 in a counter-clockwise sense when the joint is straightened. The pressure roller 66 is therefore pressed against the capstan 64 and the pushbutton 40 is maintained in down position. The toggle joint therefore functions as a detent in locking the pressure roller 66 and pushbutton 40 in position for driving the tape at normal reeling speed. The rod 320 is also advanced to the right and releases the lever 324 and associated link 332 which carries the idler roller 326. The idler roller 326 therefore moves under the bias of the spring 334 into contact with the take-up pulley 342 and the boss 276 on the capstan flywheel.

The amount of force necessary to return the toggle to the bent knee position shown in FIG. 2 through the straightened knee position is determined by the amount of overtravel of the toggle beyond the straightened knee position, since the amount of force necessary to pivot a toggle joint is determined by the angle between the toggle bars. This amount of overtravel is adjustable with the adjustable stop 340. The stop is adjusted so as to cause the toggle joint to overtravel by a distance which would necessitate an amount of force to return the toggle joint which would be greater than the forces applied through the springs 336, 154 and 354, and the forces applied to the joint by the tape 22 as it bears against the pin 86 during normal reeling operations.

When the end of the tape is reached and the tape is almost exhausted on the supply hub 24, the tension exerted by the tape on the pin 86 increases greatly and a considerable force is developed which tends to pivot the link 290 toward the right. This force is transferred to the bow lever 294. The stop 340 is adjusted so that the force of the tape against the pin when the end of the tape is reached is the minimum force necessary to return the toggle joint to the bent knee position shown in FIG. 2. When such minimum force is reached, the toggle joint will snap quickly into its initial position because the springs 154, 311 and 336 provide sufficient bias to rapidly return the toggle joint to bent knee position immediately after the knee is straightened. There is therefore provided a snap toggle tension responsive mechanism which is operative during normal reeling operations and functions as a detent to maintain the driving elements and control elements of the recording and reproducing apparatus in operating position during normal reeling operations but instantaneously restores the mechanism to idle and stop conditions when the end of the tape is reached so that a predetermined minimum amount of tension is developed and applied to the mechanism.

Figure 5:
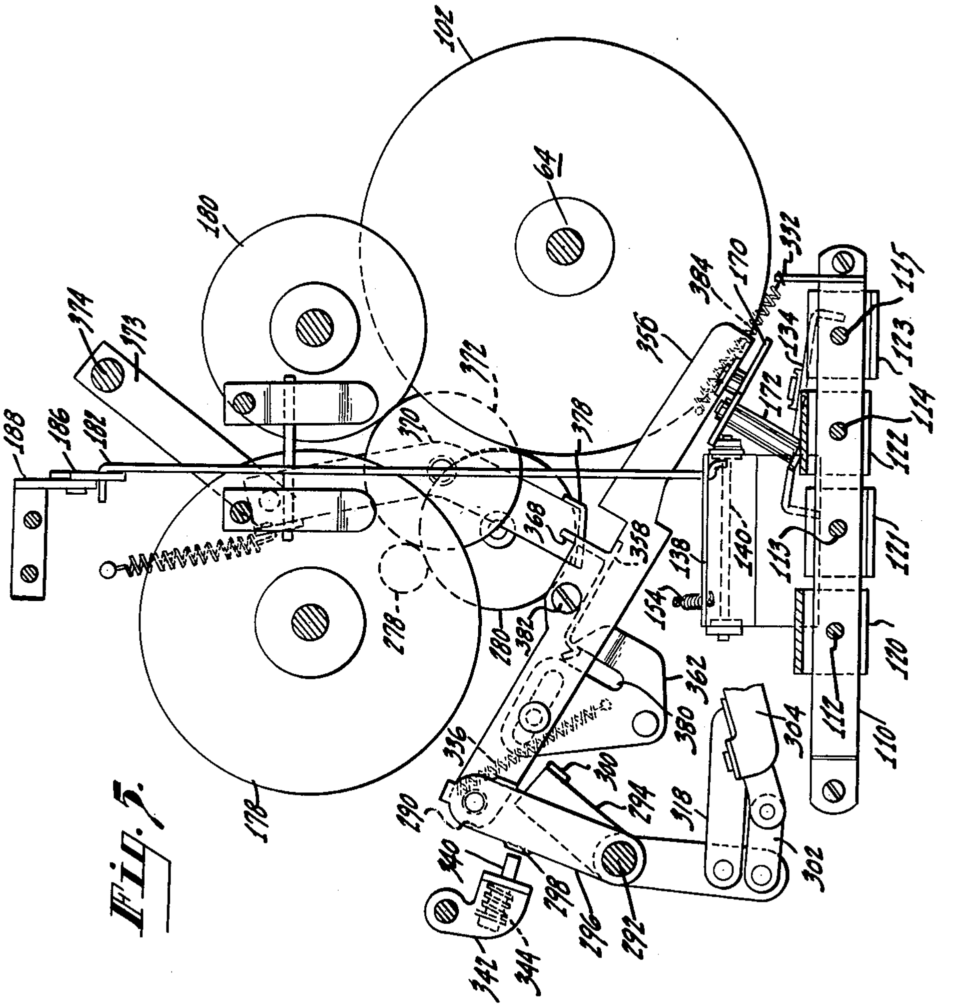
FIG. 5 is a top plan view similar to FIG. 2 showing certain parts of the mechanism conditioned for fast forward tape reeling.

A similar automatic operation is obtained for the fast forward condition of operation by another detent mechanism which is best shown in FIGS. 2 and 5 of the drawings.

This mechanism provides the advantage of occupying somewhat less space than the toggle detent mechanism used during normal reeling operations of the apparatus. This fast forward tension responsive mechanism makes use of the arm 290 which carries the finger 298 against the stop 340, as was the case with the tension responsive mechanism operative during normal reeling. This mechanism also includes the arm 296 which is pivoted on the stud 292. The free end of this arm 296 is linked to a slide 356 which actuates the fast forward tension responsive mechanism. This slide 356 is linked to the fast forward bellcrank 170. The fast forward bellcrank 170 is pivoted in a counter-clockwise direction when the fast forward pushbutton 42 is depressed and moves the fast forward actuating slide 356 to the left. The fast forward actuating slide has a latching spring 358 attached thereto by means of a bracket 360. This latching spring is carried under the cam surface of a catch plate member 362. The catch plate member 362 is supported on a stud depending from the panel 32. A slot 364 in the member 362 receives a stud 366 on the slide 356 which defines the path of movement of the slide in cooperation with the bellcrank 170.

The fast forward actuating slide has a finger 368 which depends therefrom into engagement with the upturned end of a floating link 370 which is bow-shaped. This link 370 carries an idler roller 372 which couples the fast forward pulley 180 and a motor shaft 278 in driving relationship. The link 370 is linked to an arm 373. This arm 373 is pivotally mounted on a stud 374 which depends from the panel 32. A spring 376 tends to pull the arm 372 into contact with the shaft 278 and the pulley 180. This movement is counteracted by the finger 368 on the slide 366 during all conditions of the apparatus except fast forward, since an inverted finger 378 on the link 370 engages the finger 368.

When the fast forward pushbutton 42 is depressed, the slide 356 moves to the left and the spring 358 cams over the leading edge of the catch plate member 362 and falls into a slot 380. The link 296 also moves to the left and carries the arm 290 and its pin 86 into contact with the stop 340. The brakes 176 are released upon pressing the pushbutton 42 in the manner described above. The pushbutton remains down when the plate member 362 and the spring 358 engage each other in latching relationship. The fast forward idler roller 372 also is permitted to move to a position where it frictionally couples the fast forward pulley 180 and the motor shaft 278 to each other. Thus, the tension responsive mechanism, through the actuating slide 356 thereof, conditions the recording and reproducing apparatus for fast forward operation.

The force applied by the spring 358 may be adjusted so that the minimum force required to overcome the force of the spring 358 will be about that due to the tension in the tape when the end of the tape on the supply hub is approached. This adjustment is made by means of a screw 382 having an eccentrically disposed head which is mounted on the slide 356. The periphery of this screw engages the spring so that turning the screw in one direction tends to pivot the spring downwardly in the direction of the slot 380 while turning the screw in the opposite direction permits the spring to rise somewhat out of the slot.

The tension in the tape applied through the pin 86 is sufficient to force the actuating slide 356 to the right thereby overcoming the tension of the spring 358. Once the tension in the spring 358 is overcome, the slide 356 will be brought quickly to the right under the bias of a spring 384 which is attached thereto, as well as the spring 154 which is coupled to the slide through the brake bellcrank lever 138, the knob bracket 122 and fast forward bellcrank 170. The spring 336 also tends to bias the slide to the right.

The driving force on the fast forward pulley 180 is released, since the fast forward idler roller 372 is moved out of engagement with the shaft 278 and the pulley 180 by the finger 368 in the slide 356. The brakes are simultaneously applied, since the pushbutton bracket 122 is restored to up position. Thus, the mechanism stops and returns to idle condition.

The structure and mode of operation of the apparatus for normal and fast forward reeling have been described above. The mechanism rewinding the tape on the supply hub will now be described having particular reference to FIGS. 2 and 12 of the drawings. The rewinding mechanism is operated by pressing the rewind pushbutton 41. This pushbutton pivots the rewind bellcrank 164 and pulls the rewind connecting link 168 to the left. This rewind connecting link is linked to a control lever 386 which carries the rewind tension responsive spring 88. This control lever 386 is pivoted on the stud 348 which carries the hold-down member 74. It is noted that both the hold-down member 74 and the pressure roller arm 304 are biased by springs 350 and 311, respectively, which are anchored to the rewind connecting link 168. The part of the link 168 to which these springs are anchored does not move when the arm 304 and the member 74 are actuated. Similarly, when the link 168 moves, the arm 304 and the member 74 are stationary. Accordingly, spring anchorage is provided without interference among the arm 304, the link 168 and member 74.

The control lever 386 has a depending finger 388 which contacts an adjustable stop 390. The adjustable stop 390 is similar in construction to the adjustable stop 340.

A link 392 is connected to the end of the control lever 386. This link 392 and the control lever 386 define a toggle joint with the knee of the joint therebetween. The link 392 is connected to a bow lever 394 which causes the rewind pulley 178 to be actuated when the lever 394 is pivoted to a predetermined position. The lever 394 is pivotally mounted on a stud 396 depending from the panel 32. The outboard end of the lever 394, which is near the left edge of the panel, extends downwardly toward the lower chassis member 100. A U-shaped bracket 398 is attached to this outboard end of the bow lever 394. A spring 400 is attached to this outboard end of the lever 394 and tends to pivot the lever 394 in a clockwise direction. Accordingly, the edge of the bracket 398 engages an arm 402 which is pivotally mounted on a stud 404 extending from the lower chassis member 100. The movement of the arm 402 toward the rear of the machine is limited by a stop stud 406.

A floating link 408 is linked to the arm 402 and carries an idler roller 410 at the free end thereof. This idler roller couples the inner periphery of the outer rim of the supply pulley 178 to the motor shaft 278 when the mechanism is conditioned for fast rewind operation. A pair of springs 412 and 413 are connected from a post 414 on the panel 32 to different points on the floating link 408 so that the link 408 and the arm 402 are biased for rotation in a clockwise direction thereby uncoupling the rewind idler roller 410 from the pulley 178 and the shaft 278. Thus, during all conditions of operation of the mechanism except for rewind the idler roller 410 is decoupled from the pulley 178 and shaft 278 by the biasing action of the springs 412 and 413.

When the rewind pushbutton 40 is depressed, the control lever 386 is pivoted in a clockwise direction. Sufficient force is exerted upon pressing the button 41 to overcome the bias of the springs 400 and 154, to straighten the knee of the toggle joint defined by the link 392 and the lever 386 and to cause the joint to travel over its straightened position. The amount of this overtravel is adjusted by means of the adjustable stop 390 which abuts against the finger 388 on the lever 386. As explained in connection with the description of the normal reeling toggle mechanism, the amount of overtravel is adjusted in order to adjust the force necesasry to restore the toggle to initial position shown in FIG. 2 to a certain minimum force which equals the force applied due to the tension of the tape when the tape approaches the end of the supply hub as it is being unreeled therefrom. Thus, the toggle joint functions as an adjustable detent to lock the apparatus in condition for rewind at a fast reverse speed.

It will be observed that the bow lever 394 will pivot in a counter-clockwise sense about the stud 396. The edge of the U-shaped bracket 398 therefore moves away from the arm 402 and permits the link 408 and the arm to move under its spring bias and carry the rewind idler roller 410 into frictional coupling relationship between the outer rim of the pulley 178 and the motor shaft 278.

The motor 104 which drives the shaft 278 is energized since the motor control switch is actuated when the pushbutton 41 is down. The pushbutton 41 is retained in down position by the detent action of the toggle mechanism. The brakes are also released since the pushbutton 41 is in down position.

As the end of the tape on the take-up hub 26 is approached, tension on the pin 88 increases so that the minimum amount of force necessary to bring the toggle to idle position is exerted. The lever 386 therefore pivots around the stud 348 in a counter-clockwise direction and forces the knee of the toggle through straightened position. The toggle link 392 quickly snaps back to initial position under the bias applied by the spring 400 which is attached to the bow lever 394. The brakes 176 are therefore applied quickly and the motor 104 is de-energized so that the mechanism stops and is restored automatically to idle position.

The tension responsive mechanisms which condition the apparatus for normal reeling, fast forward or rewind operation may be operated manually as well as automatically. This is accomplished by merely pressing the stop pushbutton 43. When this pushbutton is depressed, as explained heretofore, the levers 134 and 138 are pivoted. The lever 138 engages the lower end flange of the knob brackets 120, 121 and 122 and returns any one of these brackets and its associate pushbutton to up position. The force manually applied to the stop pushbutton 43 is also transferred through any one of the pushbuttons 40, 41 and 42 which happens to be down to the tension responsive mechanism associated therewith. Since this force is greater than the minimum force required to bring any of these tension responsive mechanisms to stop and idle position (shown in FIG. 2) any of the tension responsive mechanisms which happens to be set is released, as would be the case if the tension responsive mechanism operated automatically upon an increase in tension in the tape.

FIGS. 13 and 14 show an expansion linkage which is suitable for use in place of the L-shaped linkage 318. This linkage may be connected, as was the linkage 318, between the bellcrank 160 and the bow lever 294. The linkage shown in FIGS. 13 and 14 comprises three links 450, 452 and 454. The link 454 has a finger 457 extending therefrom. A spring 456 is connected between the end of this finger of the link 454 and a stud on which the links 452, and 450 are pivotally mounted. This spring 456 tends to maintain the linkage in closed position as shown in FIG. 13. A certain amount of force must be exerted on the pushbutton 40 in order to overcome the spring bias and expand the linkage to the position shown in FIG. 14. The center link 452 has a limited amount of travel determined by the stop 458 on the linkage 454 which engages a stepped end portion 460 on the center link 452. Thus, the expanded length of the linkage is limited to a distance determined by the length of the center link 452 and the position of the stop 458. This length is related to the distance over which the play/record pushbutton 40 may travel before the end flange of the bracket thereon will stop upon reaching the interlock slide in the pushbutton assembly. The full expanded length of the linkage is not attained, even though the pushbutton 40 is fully depressed.

The expansion linkage shown in FIGS. 13 and 14 provides a safety device to prevent breaking the tape by inadvertent operation of the play/record pushbutton after the tape has become exhausted on the supply hub 24 and before the cartridge is turned over. It will be appreciated that the tape is tightly stretched over the pin 86 after it has reached its end on the supply hub. The pin 86 will be disposed to the right since the normal reeling tension responsive mechanism will have been actuated upon reaching the end of tape on the supply reel. Thus, if the pin 86 were forced to the left against the tightly stretched tape by inadvertance in applying abnormal force on the play/record button, the tape might be pulled off the supply hub or ruptured. The expansion linkage shown in FIGS. 13 and 14 precludes breakage of the tape by expanding upon inadvertent operation of the play/record pushbutton 40, instead of transferring force which might otherwise break the tape.

From the foregoing description, it will be apparent that I have provided improved control apparatus for magnetic recording and reproducing apparatus which is especially suitable for handling magnetic tape records carried in cartridges. It will also be apparent that many of the features of the control apparatus which I have provided may also be incorporated in reeling systems, motor drive systems and the like to obtain the advantages of low-cost, ease of manufacture, foolproof operation, and tape rupture prevention. While I have shown my control apparatus according to one form of my invention, various components and elements useful therein, as well as variations in the mechanisms themselves, all coming within the spirit of the invention will, no doubt, readily suggest themselves to those skilled in the art. Hence, I desire that the foregoing be considered as illustrative and not in any limiting sense.

What is claimed is:

1. A pushbutton assembly having a magnetic tape transport which comprises:

a plurality of shafts supported on said transport spaced from each other and extending in the same direction;

a plurality of brackets, each having a pair of ends with flanges on one of the ends thereof, each of said brackets being slidably mounted on different ones of said shafts;

a plurality of pushbuttons, each one of said pushbuttons being mounted on the other end of a respectively different one of said brackets;

an interlocking slide disposed in the path of movement of said brackets and having teeth spaced from each other a distance slightly greater than the width of said flanges, said teeth having edges inclined in the same direction; and means for mounting said slide for movement in a direction perpendicular to said brackets, said flanges being disposed for engagement with the inclined edges of said teeth on said slide for moving said slide in a direction to dispose the teeth in position to clock the movement of said brackets after any one of said pushbuttons have been depressed.

2. A pushbutton assembly for controlling a tape transport mechanism which comprises:

a plurality of function selecting pushbutton members and another pushbutton member;

a first lever disposed in the path of said function selecting pushbutton members for engagement thereby;

a second lever having one arm disposed to engage said first lever when said other pushbutton member is depressed, the other arm of said second lever being disposed in the path of said other pushbutton member; and means coupling the other arm of said second lever to said other pushbutton member so that actuation of said other pushbutton members restores a depressed function control pushbutton to its initial position.

3. A pushbutton assembly for a magnetic tape transport which comprises a plurality of pushbutton control members, an interlock slide having a plurality of teeth extending therefrom toward said pushbutton members, means projecting from said pushbutton control members for engaging said teeth to move said slide to a position for blocking movement of the other of said pushbutton control members, and means to return said slide to a non-blocking position when said moved pushbutton control member is returned along the path of movement thereof.

4. A pushbutton assembly for a magnetic tape transport which comprises a plurality of pushbutton members for selecting different operating functions of said tape transport, another pushbutton member, and a lever having one arm thereof disposed to engage any of said function selection pushbutton members, and means coupling the other arm to said other pushbutton member so that actuation of said other pushbutton member restores a depressed function control pushbutton member to its initial position.

References Cited by the Examiner

UNITED STATES PATENTS

| | | | |
|---|---|---|---|
| 1,773,392 | 8/30 | Eichenauer. | |
| 2,086,130 | 7/37 | Hickman et al. | 242—55.12 X |
| 2,088,212 | 7/37 | Milne | 192—2 |
| 2,214,807 | 9/40 | Buckley | 192—2 |
| 2,344,091 | 3/44 | Kirk. | |
| 2,378,073 | 6/45 | Felver. | |
| 2,449,773 | 9/48 | Hargreaves et al. | 188—166 |
| 2,459,255 | 1/49 | Von Glahn. | |
| 2,535,486 | 12/50 | Dank | 242—55.12 X |
| 2,538,893 | 1/51 | Begun | 242—54.1 X |
| 2,552,789 | 5/51 | Hopkins. | |
| 2,676,212 | 4/54 | Williams | 242—55.12 X |
| 2,857,781 | 10/58 | Williams | 74—483 |
| 2,859,636 | 11/58 | Hironimus | 74—483 |
| 2,868,470 | 1/59 | Selsted | 242—55.12 |
| 2,877,958 | 3/59 | Moore et al. | 242—55.12 |
| 2,923,380 | 2/60 | Selsted et al. | 188—166 |
| 2,933,945 | 4/60 | Brewster | 74—10.27 X |
| 2,973,663 | 3/61 | Williams. | |

BROUGHTON G. DURHAM, *Primary Examiner.*

HARRISON MOSELEY, JOSEPH P. STRIZAK, DON A. WAITE, *Examiners.*